US007572320B2

(12) United States Patent
Yan et al.

(10) Patent No.: US 7,572,320 B2
(45) Date of Patent: Aug. 11, 2009

(54) METHOD AND APPARATUS FOR REMOVING HIGH CONCENTRATION OZONE FROM A WASTE GAS STEAM

(75) Inventors: Shaw-Yi Yan, Jhudong Township, Hsinchu County (TW); Sheng-Jen Yu, Taipei (TW); Shou-Nan Li, Caotun Township, Nantou County (TW); Chang-Fu Hsu, Hsinchu (TW); Ping-Chung Chung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 568 days.

(21) Appl. No.: 11/215,081

(22) Filed: Aug. 31, 2005

(65) Prior Publication Data
US 2006/0042465 A1    Mar. 2, 2006

(30) Foreign Application Priority Data
Aug. 31, 2004    (TW) .............................. 93126175 A

(51) Int. Cl.
*B01D 53/14*    (2006.01)
(52) U.S. Cl. .......................................... 95/211; 95/230
(58) Field of Classification Search .................. 95/211, 95/231, 230; 438/785; 96/290
See application file for complete search history.

(56) References Cited

U.S. PATENT DOCUMENTS

| 2,720,280 | A | * | 10/1955 | Doyle ........................... 95/170 |
| 2,930,700 | A | * | 3/1960 | Bradof ........................... 426/46 |
| 3,654,103 | A | * | 4/1972 | McRae ........................... 423/235 |
| 5,866,752 | A | * | 2/1999 | Goozner ........................ 204/157.3 |
| 5,945,078 | A | * | 8/1999 | Taylor et al. ................... 423/210 |
| 6,759,018 | B1 | * | 7/2004 | Arno et al. .................... 423/210 |
| 6,946,408 | B2 | * | 9/2005 | Le et al. ....................... 438/785 |
| 2002/0144958 | A1 | * | 10/2002 | Sherman ....................... 210/758 |

FOREIGN PATENT DOCUMENTS

| JP | 56-028624 | * | 3/1981 |
| JP | 57-174122 | * | 10/1982 |

* cited by examiner

*Primary Examiner*—Duane Smith
*Assistant Examiner*—Ives Wu
(74) *Attorney, Agent, or Firm*—Bacon & Thomas, PLLC

(57) ABSTRACT

A method for removing high concentration ozone from a waste gas stream is disclosed, which includes the following steps: (1) providing an apparatus, which includes: a tank having an input port, an exhaust port and a packing, wherein the input port is near the bottom of the tank, the exhaust port is on the top of the tank, and the packing is contained in the tank; a liquid injection element for injecting reductant solution through the packing; and a storage vessel connecting to the liquid injection element; (2) transporting a gas into the tank through the input port for contacting the reductant solution; and (3) the gas exiting the reactor by way of the exhaust port.

9 Claims, 1 Drawing Sheet

METHOD AND APPARATUS FOR REMOVING HIGH CONCENTRATION OZONE FROM A WASTE GAS STEAM

BACKGROUND OF THE INVENTION

1. Field of the Invention

The present invention relates to a flush apparatus and method; more particularly, a flush apparatus and method to be used in removing high concentration ozone from a waste gas stream.

2. Description of Related Art

As the high-tech industry vigorously develops, the semiconductor industry, including manufacture of integrated circuits, and the photonics industry, also grow rapidly, thereby greatly enhancing the economic development. However, environmental problems such as waste liquids, waste water, and waste gas steam produced during the manufacturing of semiconductor elements should be taken seriously. Thin film oxidation and wet cleaning of the semiconductor manufacture both use high concentration ozone, $O_3$. If residual ozone ($O_3$) after the manufacture is not properly handled, many working safety and environment problems will occur.

Most semiconductor manufacturing process presently involves electrothermal and flush processing equipment to handle ozone-related manufactured waste gas steam. Electrothermal processing not only consumes power, but also the TEOS (Tetraethoxylsilane) of the manufactured waste ozone gas steam, after electrical heating and oxidation, produces $SiO_2$ that seriously blocks the piping and further effects the stability of the front end manufacturing system, which in turn increases the risk expense of front end manufacturing. Sole use of the flush processing has the problem of low elimination rate of ozone and thus is not an effective method. Some people, on the other hand, suggest the use of polymers to process ozone through a reaction between solid and gas to reduce the gaseous ozone. However, the application uses chemical materials of high complexity and high expense. The design has a low gas flow rate and processes low ozone concentration, and thus it is not feasible in back end processing of semiconductors and photoelectric processes. According to the above reasons, prior technology includes no simple and effective method or apparatus in removing high concentration ozone. A method for effectively reducing ozone concentration, yet not blocking the piping, is greatly needed.

SUMMARY OF THE INVENTION

The present invention discloses an apparatus for removing high concentration ozone from a waste gas steam, comprising: one tank, one liquid injection element, and one storage vessel. The said tank comprises at least one input port on the bottom of the tank, at least one exhaust port on the top of the tank, and packing located in the tank. The liquid injection element injects the reductant solution into the tank, and the solution passes through the packing. The storage vessel is connected to the liquid injection element.

Moreover, the present invention discloses a method for removing high concentration ozone from a waste gas steam, comprising the following steps: (1) providing an apparatus that includes a tank, a liquid injection element and a storage vessel. The tank further comprises at least a input port on the bottom of the tank, at least an exhaust port on the top of the tank, and packing located in the tank. The liquid injection element injects the reductant solution into the tank, the solution passes through the packing and the storage vessel is connected to the liquid injection element; (2) transporting gas into the tank through the input port; and (3) exhausting gas through the exhaust port.

The type of liquid injection element of the present invention is not restricted. The liquid injection element is used to import a reductant solution into the tank and is preferably a sprayer to allow the packing to evenly get to the reductant solution. The liquid injection element can further include a pump to pressurize sodium nitrite solution. The exhaust port of the present invention can further include an exhaust fan to effectively exhaust gas. In addition, the reductant of the present invention can be any prior reductant, but preferably is phosphate, sulfite, or nitrite. The concentration of the reductant solution is not restricted, but preferably is 0.0001~3% by weight, yet better is 0.001~0.06% by weight and the best is 0.001~0.006% by weight. The flow rate of the gas of the present invention is not restricted, but preferably is 10~10,000 L/min, better is 200~300 L/min and the best is 230~270 L/min. The ozone concentration of the waste gas steam to be processed ranges from 0.0001~10,000 ppm in the present invention. The present invention removes not only high concentration ozone, but also the concentration of TEOS of the waste ozone gas steam, and does not produce $SiO_2$ which otherwise seriously blocks the piping. The method of the present invention for removing high concentration ozone from a waste gas steam is preferably used in processing waste gas steam produced in thin film oxidation and wet cleaning of the semiconductor manufacture process. It thus provides a solution to the problems of instability in present electrothermal scrubbers, or ineffectiveness in water flush scrubbers for processing ozone.

DETAILED DESCRIPTION OF THE PREFERRED EMBODIMENT

Figure 1:
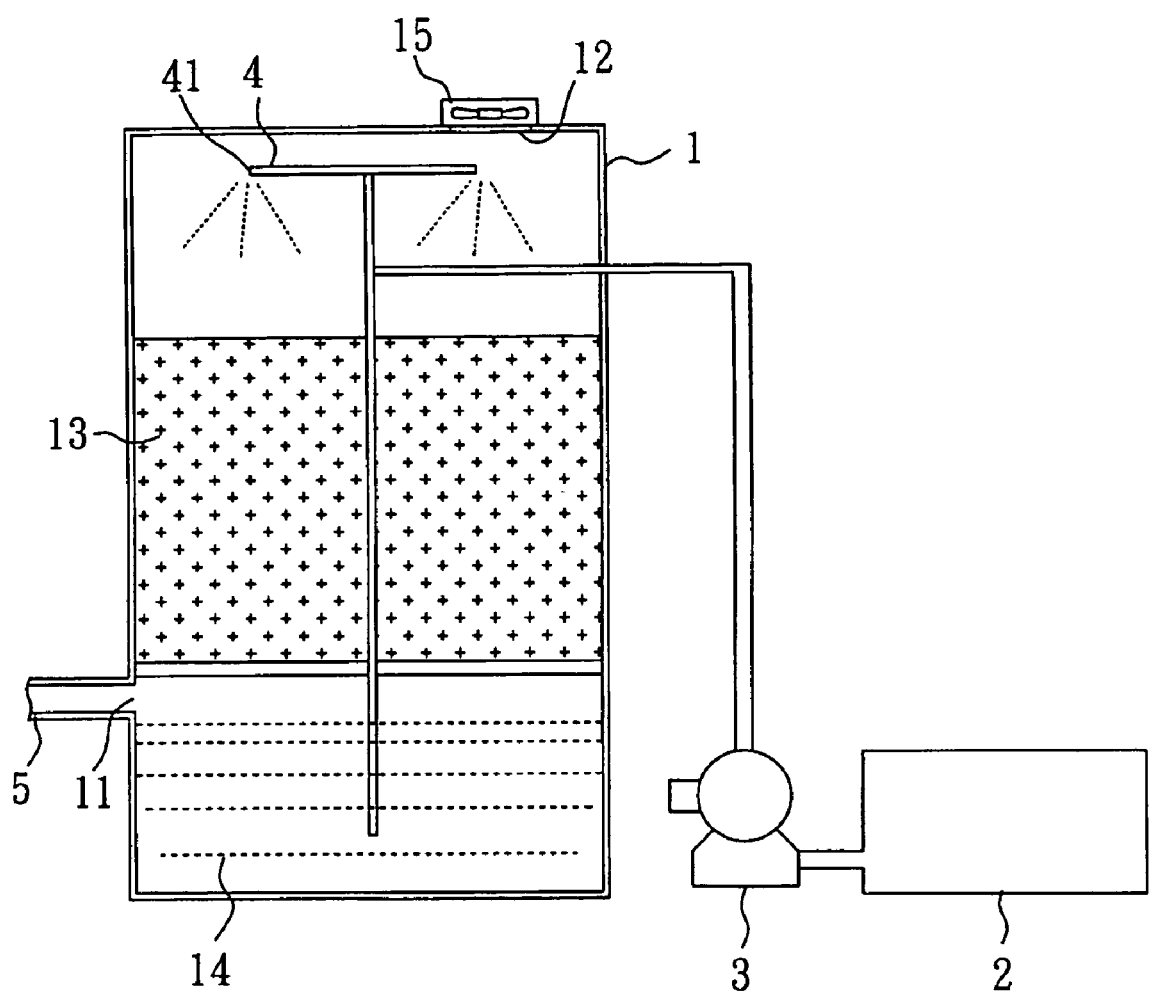
FIG. 1 is a diagram of a flush apparatus that adds sodium nitrite according to the present invention.

FIG. 1 shows an apparatus for removing high concentration ozone from a waste gas steam which includes a tank 1, a storage vessel 2, and a pump 3 connecting the tank and the storage vessel 2 via a feeder tube (not numbered). An input port 11 is formed on a lower first side of the tank 1, and a pipe 5 extends from the input port 11 to a gas supply (not shown). An exhaust port 12 is formed in a top of the tank 1 and an exhaust fan 15 is mounted in the exhaust port 12. A sump 14 is formed in the bottom of the tank 1 and is below both the packing 13 and the input port 11. The tank 1 contains a specified amount of packing 13 extending from above the input port 11. A T-shaped sprayer 4 is mounted in the tank 1 such that a horizontal bar of the sprayer 4 is placed below the top of the tank 1 and above both the packing 13 and the feeder tube which communicates the pump 3 with the interior of the sprayer 4. Two distal ends of the horizontal bar each define an nozzle 41. When gas in the piping 5 is transported to the tank 1 via the input port 11, the gas will first pass through the intervals of the packing 13, and then exhaust from the exhaust port 12 on the top of the tank 1. A reductant solution contained in the storage vessel 2 is pressurized and transported to the sprayer 4 through the pump 3, and evenly sprayed on the packing 13 through the nozzles 41. The reductant solution then, through the intervals of the packing 13, flows down to the bottom of the tank 1, and is stored in the sump 14 of the tank 1.

In this preferred embodiment, residual high concentration ozone manufactured in thin film oxidation or wet etching is transported to the pipe 5, and enters the tank 1 via the input port 11. When the waste gas steam enters the tank 1, it will first pass up through the packing 13, and then will be exhausted from the exhaust port 12 due to the fan 15. Similarly, when the reductant solution is sprayed on the packing 13, it will flow down to the bottom of the tank 1 through the intervals of the packing 13. Both the waste gas steam and the reductant solution travel through the intervals of the packing 13 and fully contact with each other, the circulating route of the waste gas steam and the reductant solution thus rapidly increases, which in turn rapidly increases the contact area and contacting time of the waste gas steam and the reactant solution. The enhanced contact area and contacting time allows the reactant and ozone to fully chemically react, thereby effectively removing the high concentration ozone. In other words, the apparatus for removing high concentration ozone from a waste gas steam of the present invention can increase the reacting amount and reacting time required by the chemical reaction for the ozone and the reactant, thus effectively removing the high concentration ozone from the waste gas steam.

The reactant of the present invention can be phosphate, sulfite, or nitrite. In this preferred embodiment, water solution and water solution with sodium nitrite of the same amount of flow rate (both 1.71 gpm) are used to compare the effect of flush processing and flush processing with added reductant to the ozone concentration in waste gas steam. The test result of the preferred embodiment is as shown in Table 1, when the flush processing is used to process the waste gas steam, the elimination rate is only 10.1%. In other words, flush processing cannot effectively remove ozone concentration in waste gas steam. However, when the flush processing with sodium nitrite added is applied to process waste gas steam, the elimination rate of the ozone in waste gas steam is as high as and higher than 98.5%. What is more important is that the required added amount of sodium nitrite is only 0.003% by weight. Even when reducing the added amount of sodium nitrite to only 0.002% by weight, the elimination rate of ozone in waste gas steam is still as high as 90.8%. That is, the method for removing high concentration ozone from a waste gas steam of the present invention only requires a very small amount of reductant, yet the effect of removing ozone in waste gas steam is very obvious. The ozone terminal concentration after processing is even lower than the minimum detection threshold. Moreover, the present invention removes not only high concentration ozone, but also the concentration of TEOS of the manufactured waste ozone gas steam. The test result is as shown in Table 2. When processing TEOS in waste gas steam using the flush processing with sodium nitrite added, the elimination rate is higher than 95.9% even when the added sodium nitrite concentration is only 0.003% by weight. The TEOS terminal concentration is lower than the minimum detection threshold. When the flush processing is used to process waste gas steam, the elimination rate of TEOS concentration is only 48.1%, far lower than that of processed by flush processing with sodium nitrite added. In addition, compared to the traditional electrothermal processing, the present invention discloses a method that does not require heating. The TEOS in waste gas steam will thus not produce $SiO_2$ which would otherwise block the piping. Therefore, flush processing with added reductant can also increase the stability of manufacture. The method for removing high concentration ozone from a waste gas steam of the present invention can not only remove ozone and TEOS concentrations from a waste gas steam, but also has no problem of blocked piping experienced with the prior art wherein piping became blocked. The expense of electrothermal operation can also be eliminated.

TABLE 1

| $NaNO_2$ Conc. Wt % | Fresh Water Flow Rate gpm | DRE of $O_3$ % |
|---|---|---|
| 0 | 1.71 | 10.1 |
| ~<0.002 | 1.71 | 90.8 |
| 0.003 | 1.71 | >98.5(terminal N.D) |

TABLE 2

| $NaNO_2$ Conc. Wt % | Fresh Water Flow Rate gpm | DRE of $O_3$ % |
|---|---|---|
| 0 | 1.71 | 34.0 |
| ~<0.002 | 1.71 | 48.1 |
| 0.003 | 1.71 | >95.9(terminal N.D) |

Although the present invention has been explained in relation to its preferred embodiment, it is to be understood that many other possible modifications and variations can be made without departing from the spirit and scope of the invention as hereinafter claimed.

What is claimed is:

1. A method for removing high concentration ozone and TEOS from a waste gas stream, comprising the following steps:
    (1) providing an apparatus, comprising a tank having an input port, an exhaust port and a packing, wherein the input port is on a side of the tank and close to a bottom face of the tank, the exhaust port is on a top face of the tank, and the packing is located in the tank; a liquid injection element for injecting a reductant solution through the packing; and a storage vessel connecting to the liquid injection element;
    (2) transporting a gas into the tank through the input port to contact with the reductant solution; and
    (3) exhausting the gas via the exhaust port;
    wherein the reductant is phosphate or nitrite, and the concentration of the reductant solution ranges from 0.0001 to 3% by weight.

2. A method for removing high concentration ozone from a waste gas stream as claimed in claim 1, wherein the gas in the step (2) containing ozone with concentration ranges from 0.0001 to 10,000 ppm.

3. A method for removing high concentration ozone from a waste gas stream as claimed in claim 1, wherein the processed flow rate of the gas is from 10 to 10,000 L/min.

4. A method for removing high concentration ozone from a waste gas stream as claimed in claim 1, wherein the gas is waste gas produced in thin film oxidation or wet cleaning.

5. A method for removing high concentration ozone from a waste gas stream as claimed in claim 1, wherein the liquid injection element further comprises an electric pump.

6. A method for removing high concentration ozone from a waste gas stream as claimed in claim 1, wherein the liquid injection element is a sprayer.

7. A method for removing high concentration ozone from a waste gas stream as claimed in claim 1, wherein an exhaust fan is mounted at the exhaust port.

8. A method for removing high concentration ozone from a waste gas stream as claimed in claim 1, further comprising the step of:
(4) increasing the circulating route of the waste gas stream and the reductant solution such that the waste gas stream and the reductant solution fully contact each other through intervals of the packing.

9. A method for removing high concentration ozone and TEOS from a waste gas stream, comprising the following steps:
(1) providing an apparatus, comprising a tank having an input port, an exhaust port and a packing, wherein the input port is on a side of the tank and close to a bottom face of the tank, the exhaust port is on a top face of the tank, and the packing is located in the tank; a liquid injection element for injecting a reductant solution through the packing; and a storage vessel connecting to the liquid injection element;
(2) transporting a gas into the tank through the input port to contact with the reductant solution;
(3) exhausting the gas via the exhaust port; and
(4) increasing the circulating route of the waste gas stream and the reductant solution such that the waste gas stream and the reductant solution fully contact each other through intervals of the packing;.

Wherein the reductant is phosphate or nitrite, and the concentration of the reductant solution ranges from 0.0001 to 3% by weight.

\* \* \* \* \*